US010943341B2

(12) United States Patent
Wang

(10) Patent No.: US 10,943,341 B2
(45) Date of Patent: Mar. 9, 2021

(54) METHOD FOR IMAGE PROCESSING, ELECTRONIC DEVICE AND COMPUTER READABLE STORAGE MEDIUM

(71) Applicant: Guangdong OPPO Mobile Telecommunications Corp., Ltd., Guangdong (CN)

(72) Inventor: Yulu Wang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/249,537

(22) Filed: Jan. 16, 2019

(65) Prior Publication Data

US 2020/0065950 A1 Feb. 27, 2020

(30) Foreign Application Priority Data

Aug. 22, 2018 (CN) .......................... 201810962774.0

(51) Int. Cl.
*G06T 5/50* (2006.01)
*H04N 5/235* (2006.01)
(Continued)

(52) U.S. Cl.
CPC ............. *G06T 5/50* (2013.01); *H04N 5/2351* (2013.01); *H04N 5/2353* (2013.01);
(Continued)

(58) Field of Classification Search
CPC ............. G06T 5/50; G06T 2207/20221; G06T 2207/30201; G06T 5/007; H04N 5/2351;
(Continued)

(56) References Cited

U.S. PATENT DOCUMENTS

2007/0206941 A1 9/2007 Maruyama et al.
2007/0212043 A1 9/2007 Izawa
(Continued)

FOREIGN PATENT DOCUMENTS

CN 101241294 A 8/2008
CN 102065224 A 5/2011
(Continued)

OTHER PUBLICATIONS

EP Search Report for European Application No. 19152527.8 dated Jul. 23, 2019.
(Continued)

*Primary Examiner* — Albert H Cutler

(57) ABSTRACT

An image processing method, an electronic device and a storage medium. The method includes: under a preset condition, when detecting that an image currently captured by a camera module contains a human face, determining a reference photosensitivity corresponding to each frame of images to be captured according to a current jitter degree of the camera module; determining an exposure duration corresponding to each frame of images to be captured according to luminance of a current shooting scene, the reference photosensitivity corresponding to each frame of the images to be captured, and a preset mode of exposure compensation; capturing a plurality of frames of images in sequence according to the reference photosensitivity and the exposure duration corresponding to each frame of the images to be captured; and performing synthesis processing on the captured plurality of frames of images to generate a target image.

20 Claims, 4 Drawing Sheets

(51) Int. Cl.
    *G06K 9/00*      (2006.01)
    *G06T 5/00*      (2006.01)
    *H04N 5/232*      (2006.01)
    *H04N 5/353*      (2011.01)
    *H04N 5/355*      (2011.01)

(52) U.S. Cl.
    CPC ............ *G06K 9/00228* (2013.01); *G06T 2207/20221* (2013.01); *G06T 2207/30201* (2013.01); *H04N 5/2355* (2013.01)

(58) Field of Classification Search
    CPC .. H04N 5/2353; H04N 5/2355; H04N 5/2356; H04N 5/23248; H04N 5/23219; H04N 5/23232; H04N 5/23258; H04N 5/353; H04N 5/35581; H04N 5/35536; H04N 5/35545; H04N 5/35554; H04N 5/35563; H04N 5/35572; H04N 5/3559; H04N 5/23218; H04N 5/23251; G06K 9/00228; G06K 9/00221; G06K 9/00268
    See application file for complete search history.

(56) References Cited

U.S. PATENT DOCUMENTS

| | | | |
|---|---|---|---|
| 2008/0260375 A1* | 10/2008 | Yumiki | ............ H04N 5/23219 396/263 |
| 2011/0149095 A1 | 6/2011 | Kikuchi | |
| 2014/0186017 A1 | 7/2014 | Shibata | |

FOREIGN PATENT DOCUMENTS

| | | |
|---|---|---|
| CN | 102457675 A | 5/2012 |
| CN | 102714699 A | 10/2012 |
| CN | 103384309 A | 11/2013 |
| CN | 105791707 A | 7/2016 |
| CN | 106375676 A | 2/2017 |
| CN | 106469433 A | 3/2017 |
| CN | 107613191 A | 1/2018 |
| CN | 107770438 A | 3/2018 |
| CN | 107888841 A | 4/2018 |
| CN | 109194882 A | 1/2019 |
| EP | 1672914 A2 | 6/2006 |
| EP | 2216987 A2 | 8/2010 |
| JP | 2009152803 A | 7/2009 |

OTHER PUBLICATIONS

PCT/CN2019074993 International Search Report dated Apr. 17, 2019.
EP Examination for EP 19152527.8 dated Mar. 23, 2020.
English Translation of CN OA for CN 201810962774.0 dated Mar. 10, 2020.
India Exam Report for IN Application 201914003598 dated Aug. 8, 2020.

\* cited by examiner

METHOD FOR IMAGE PROCESSING, ELECTRONIC DEVICE AND COMPUTER READABLE STORAGE MEDIUM

CROSS-REFERENCE TO RELATED APPLICATION(S)

This application claims priority to Chinese Patent Application No. 20181092774.0, filed on Aug. 22, 2018, the entire disclosure of which is hereby incorporated by reference.

TECHNICAL FIELD

The present disclosure relates to, but is not limited to, the field of imaging technology, in particular to an image processing method, an electronic device and a storage medium.

BACKGROUND

With the development of science and technology, smart mobile terminals (such as smart phones, tablets, etc.) are becoming more and more popular. The vast majority of smartphones and tablets have built-in cameras, and with the enhancement of mobile terminal processing power and the development of camera technology, the built-in cameras are becoming more powerful and the quality of photos taken is getting increasingly higher. In the related art, mobile terminals are easy to operate and carry, and it has become a common practice for people to take photos using mobile terminals such as smart phones and tablets in daily life.

Intelligent mobile terminals bring convenience to people's daily photographing, and people also have higher and higher requirements on the quality of the photographed images. However, due to lack of professional photographing skills, people generally do not know how to set appropriate shooting parameters according to shooting scenes, so it is difficult to capture images as good as those taken by professional cameras, especially in severe environments, such as rainy, backlight, or night scenes, etc. Therefore, intelligent technologies of scene recognition that do not require setting shooting parameters have come into being.

In some shooting scenes, such as backlight scenes or night portrait scenes, due to poor lighting conditions, usually the exposure duration is lengthened to ensure the amount of exposure, and consequently, not only the overall brightness of the captured image is low, but also the effect of face brightening is poor, and when the face is normally exposed, the bright area of the scene is prone to overexposure and brightness distortion.

SUMMARY

Implementations of the disclosure provide an image processing method, an electronic device and a storage medium.

In one aspect, an implementation of the disclosure provides an image processing method, which may include: under a preset condition, when detecting that an image currently captured by a camera module contains a human face, determining a reference photosensitivity corresponding to each frame of images to be captured according to a current jitter degree of the camera module; determining an exposure duration corresponding to the each frame of the images to be captured according to luminance of a current shooting scene, the reference photosensitivity corresponding to each frame of the images to be captured, and a preset mode of exposure compensation; capturing a plurality of frames of images in sequence according to the reference photosensitivity and the exposure duration corresponding to each frame of the images to be captured; and performing synthesis processing on the captured plurality of frames of images to generate a target image.

In another aspect, an implementation of the present disclosure provides an electronic device, which may include a storage device and a processor, the storage device storing processor-readable instructions that are executable by the processor to perform actions of: under a preset condition, when detecting that an image currently captured by a camera module contains a human face, determining a reference photosensitivity corresponding to each frame of images to be captured according to a current jitter degree of the camera module; determining an exposure duration corresponding to the each frame of the images to be captured according to luminance of a current shooting scene, the reference photosensitivity corresponding to the each frame of the images to be captured, and a preset mode of exposure compensation; capturing a plurality of frames of images in sequence according to the reference photosensitivity and the exposure duration corresponding to the each frame of the images to be captured; and performing synthesis processing on the captured plurality of frames of images to generate a target image.

In yet another aspect, an implementation of the present disclosure provides a computer readable storage medium which may include a computer program that is executable by a processor to perform actions of: under a preset condition, when detecting that an image currently captured by a camera module contains a human face, determining a reference photosensitivity corresponding to each frame of images to be captured according to a current jitter degree of the camera module; determining an exposure duration corresponding to the each frame of the images to be captured according to luminance of a current shooting scene, the reference photosensitivity corresponding to the each frame of the images to be captured, and a preset mode of exposure compensation; capturing a plurality of frames of images in sequence according to the reference photosensitivity and the exposure duration corresponding to the each frame of the images to be captured; and performing synthesis processing on the captured plurality of frames of images to generate a target image.

The nature and advantages of implementations of the present disclosure may be better understood with reference to the following detailed description and accompanying drawings.

BRIEF DESCRIPTION OF DRAWINGS

The drawings are intended to provide a further understanding of the technical solution of the present disclosure and form a part of the specification, and together with the implementations of the present disclosure are used to explain the technical solution of the present disclosure and do not constitute a limitation on the technical solution of the present disclosure.

DETAILED DESCRIPTION

Figure 1:
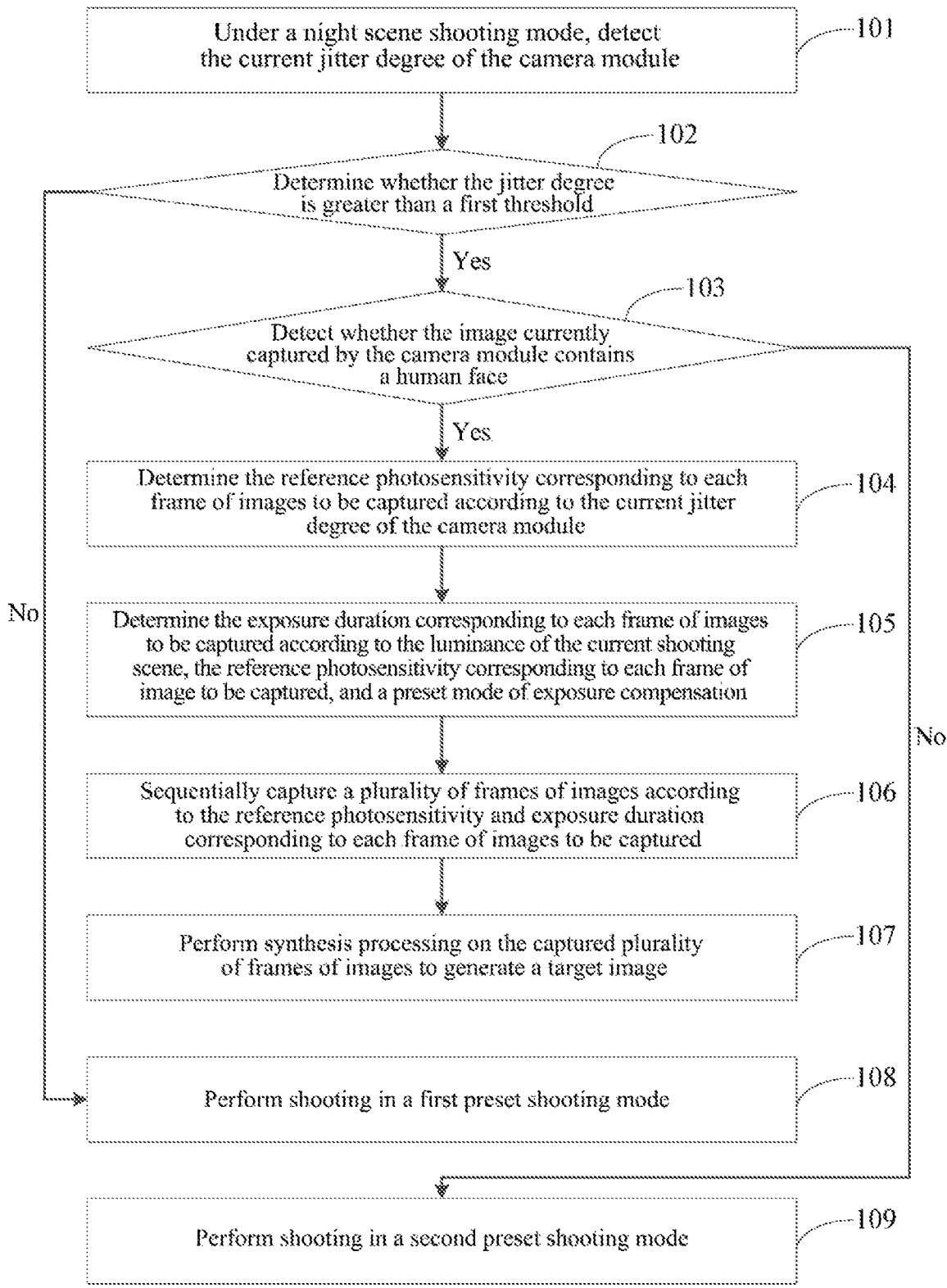
FIG. 1 is a flowchart of an image processing method according to an implementation of the present disclosure.

Implementations of the present disclosure are described in detail below, examples of which are shown in the accompanying drawings, wherein the same or similar reference numerals refer to the same or similar elements throughout. The implementations described below with reference to the drawings are exemplary and are intended to explain the present disclosure and are not to be construed as limiting the present disclosure.

Among technologies in the related art, the technology suitable for night scene shooting includes an HDR+ technology in high-dynamic range (HDR) technology. HDR+ technology refers to the technology of shooting multiple underexposed images with the same exposure duration and then superimposing these images to achieve the target brightness in the RAW domain (the original data of digital signals converted by a complementary metal oxide semiconductor (CMOS) or charge-coupled device (CCD) image sensor from captured light source signals). Because the exposure duration is short and the exposure time is the same, it has a good effect in elimination of jitter and ghosting, but it has a very limited increase in dynamic range and does not have a sufficient increase in overall picture brightness.

Implementations of the disclosure provide an image processing method aiming at the problem that in the related art, portrait images shot in some scenes not only have low dynamic range and overall brightness, but also have poor effect of face brightening, and the bright area of the scene is prone to overexposure and brightness distortion, which affects the user experience.

According to an image processing method provided by an exemplary implementation of the present disclosure, when the shooting scene meets a preset condition and contains a human face, the reference photosensitivity corresponding to each frame of images to be captured is determined according to a current jitter degree of the camera module, and the exposure duration corresponding to each frame of images to be captured is determined according to the luminance of the current shooting scene and a preset mode of exposure compensation, so that the shot images with different exposure durations are synthesized, not only the overall dynamic range and the human face brightening effect of the shot portrait images are improved, but also overexposure and brightness distortion in the bright area of the scene are avoided, the visual effect of the portrait images is improved, and the user experience is improved.

The implementations of the present disclosure will be described in details below on image processing method, apparatus, electronic equipment, storage medium and computer program with reference to the accompanying drawings.

FIG. 1 is a flowchart of an image processing method according to an exemplary implementation. As shown in FIG. 1, the image processing method may include actions 101 to 109.

In action 101, under a night scene shooting mode, a current jitter degree of a camera module is detected.

In this exemplary implementation, the night scene shooting mode refers to the shooting mode used when the value of ambient luminance of the shooting scene is less than a preset threshold. That is, the value of ambient luminance of the shooting scene is the decisive factor on whether to enable the night scene shooting mode, regardless whether the time of the shooting scene is "night". For example, if the lighting condition is good but it is already "night" at the time, that is, the value of ambient luminance is greater than the preset threshold in the night scene, the night scene shooting mode need not to be enabled. However, in a scene with poor lighting condition but it is not "night" time, i.e. a scene with a value of ambient luminance which is less than the preset threshold, the night scene shooting mode needs to be enabled. In an exemplary implementation, the shooting mode used when the value of ambient luminance of the shooting scene is less than the preset threshold may also be referred to as a dark light shooting mode. That shooting mode to be enabled is only an example. In one exemplary implementation, action 101 may be used to detect a current jitter degree of the camera module when the value of ambient luminance of the shooting scene is less than the preset threshold.

It should be noted that in actual usage, the threshold of ambient luminance can be preset according to actual needs or experience, which is not limited in the implementations of this disclosure.

In the implementation of the present disclosure, the current jitter degree of the electronic device, that is, the current jitter degree of the camera module, can be determined by acquiring the current gyro-sensor information of the electronic device.

A gyro-sensor, also called an angular velocity sensor, can measure the rotational angular velocity of a physical quantity when it is deflected or tilted. In electronic devices, gyro-sensors can well measure the movement of rotation or deflection, so that the actual movement of the user can be accurately analyzed and determined. Gyro information of an electronic device may include information of gyro motion in three dimensions in a three-dimensional space, and the three dimensions in the three-dimensional space may be represented by x-axis, y-axis, and z-axis, respectively, where the x-axis, y-axis, and z-axis are in a two-to-two perpendicular relationship.

In a possible implementation of the present disclosure, the current jitter degree of the camera module can be determined according to the current gyro information of the electronic device. The greater an absolute value of the amount of gyro motion of electronic device in three directions, the greater the degree of jitter of the camera module. For example, a threshold for the absolute value of the amount of gyro motion in three directions can be preset, and the current jitter degree of the camera module can be determined according to a relationship between the obtained sum of absolute values of the amount of gyro motion in three directions and the preset threshold.

For example, assuming that the preset thresholds are a second threshold a, a third threshold b, and a fourth threshold c, and a<b<c, the sum of the absolute values of the amount of gyro motion currently acquired in the three directions is s. If s<a, it can be determined that the current jitter degree of the camera module is "no jitter"; If a<s<b, it can be determined that the current jitter degree of the camera module is "slight jitter". If b<s<c, it can be determined that the current jitter degree of the camera module is "small jitter". If s>c, it can be determined that the current jitter degree of the camera module is "large jitter".

It should be noted that the above examples are only illustrative and should not be considered as limitations on the present disclosure. In practice, the number of thresholds and the value of each threshold can be preset according to actual needs, and the mapping relationship between gyro information and jitter degree of camera module can be preset according to the relationship between gyro information and each threshold.

In another exemplary implementation of the present disclosure, the current jitter degree of the electronic device, i.e., the current jitter degree of the camera module, can be determined by an MEMS (Micro Electro Mechanical Systems) gyro-sensor. When the MEMS gyro-sensor detects the movement of an electronic device such as a camera module, it transmits a signal to the processor. The processor compares a value of the received signal with one or more preset thresholds to obtain the jitter degree of the camera module. For example, two thresholds e and f are preset and the threshold e is less than the threshold f, if the value of the received MEMS gyro-sensor signal is less than the threshold e, it can be determined that the current jitter degree of the camera module is "no jitter". If the value of the received MEMS gyro-sensor signal is greater than the threshold e and less than the threshold f, it can be determined that the current jitter degree of the camera module is "small jitter". If the value of the received MEMS gyro-sensor signal is greater than the threshold f, it can be determined that the current jitter degree of the camera module is "large jitter". This exemplary implementation is only exemplified by two thresholds and three degrees of jitter. In other exemplary implementations, one threshold and two degrees of jitter, or three thresholds and four degrees of jitter may be used.

The degrees of jitter described in the above implementations include "no jitter", "slight jitter", "small jitter" and "large jitter" for convenience of understanding, and can otherwise be expressed by numerical values or symbols in practical applications.

In action 102, it is determined whether the jitter degree is greater than a first threshold, if yes, action 103 is executed; if not, action 108 is executed.

The above determination of whether the degree of jitter is greater than the first threshold may be, for example, to compare a value or symbol representing the degree of jitter with a preset value or symbol (i.e., the first threshold). If a MEMS gyro-sensor is used, the received MEMS gyro-sensor signal can be directly compared with the first threshold.

The above implementation is only exemplary, that is, action 101 and action 102 are optional preset conditions. In another exemplary implementation, the preset condition may be that the following action 103 may be performed as long as the value of ambient luminance of the current shooting scene is less than the preset threshold. In yet another exemplary implementation, the preset condition may be that the following action 103 may be performed as long as it is detected that the current jitter degree of the camera module is greater than the first threshold.

In action 103, it is determined whether an image currently captured by the camera module contains a human face, if yes, action 104 is executed; if not, action 109 is executed.

In the exemplary implementation of the present disclosure, when a first preset condition is satisfied (e.g., the value of ambient luminance of the current shooting scene is less than the preset threshold and the current jitter degree of the camera module is detected to be greater than the first threshold) and the image currently captured by the camera module is detected to contains a face, or when a second preset condition is satisfied (e.g., the value of ambient luminance of the current shooting scene is less than the preset threshold) and the image currently captured by the camera module is detected to contains a face, or when a third preset condition is satisfied (e.g., the current jitter degree of the camera module is detected to be greater than the first threshold) and the image currently captured by the camera module is detected to contain a face, the image processing method provided by the implementation of disclosure may be carried out. When none of the above conditions is met, other shooting modes may be used for shooting. A shooting mode corresponding to a current condition may be used for shooting, which is not limited in the implementation of the disclosure.

In the implementation of the disclosure, whether the image currently captured by the camera module contains a human face can be determined by the technology of face recognition. The technology of face recognition is used to identify a person by analyzing and comparing visual feature information of a face, and it belongs to the technology of biological feature recognition in which individuals are distinguished by biological features of organisms (especially human beings in general). At present, the technology of face recognition has been applied in many fields, such as face autofocus and smiling face shutter functions of a digital camera; enterprise, residential security and management; access control system; camera monitoring system, etc. Common algorithms of face recognition include feature-based recognition algorithm, appearance-based recognition algorithm, template-based recognition algorithm, recognition algorithm using neural networks, and so on.

In action 104, according to the current jitter degree of the camera module, the reference photosensitivity corresponding to each frame of images to be captured is determined.

The photosensitivity, also known as ISO value, is an indicator of how sensitive a negative film is to light. For a negative film with lower ISO, it takes longer exposure duration to achieve the same image as a negative film with higher ISO. The photosensitivity of a digital camera is an indicator similar to the photosensitivity of a film. The ISO of a digital camera can be adjusted by adjusting the sensitivity of a photosensitive device or combining photosensitive dots, that is, the ISO can be improved by increasing the light sensitivity of the photosensitive device or combining several adjacent photosensitive dots. In order to reduce exposure duration, the use of relatively high photosensitivity usually introduces more noise, resulting in a decrease in image quality, regardless of digital photography or negative film photography.

In the implementation of the present disclosure, the reference photosensitivity may be the lowest photosensitivity corresponding to the current jitter degree, and the reference photosensitivity is determined according to the current jitter degree of the camera module.

In the implementation of the disclosure, the dynamic range and the overall brightness of a portrait image can be improved by simultaneously capturing multiple frames of images with lower photosensitivity and combining the acquired multiple images to generate a target image, and noise in the image can be effectively suppressed and the quality of the captured image can be improved by controlling the value of photosensitivity. The number of images to be captured may be preset according to actual needs, and in an exemplary implementation, the number of images to be captured may be 7 frames.

It can be understood that the number of captured images and the photosensitivity of captured images will affect the overall shooting duration, and if the overall shooting duration is too long, it may exacerbate the jitter degree of camera module during hand-held shooting, thus affecting the image quality. Therefore, according to the current jitter degree of the camera module, the reference photosensitivity corresponding to each frame of images to be captured can be determined, so that the shooting duration can be controlled within an appropriate range.

For example, if the current jitter degree of the camera module is small, the reference photosensitivity corresponding to each frame of images to be captured can be appropriately compressed to a smaller value to effectively suppress the noise of each frame of image and improve the quality of the shot image. If the current jitter degree of the camera module is large, the reference photosensitivity corresponding to each frame of images to be captured can be appropriately increased to a greater value to shorten the shooting duration.

For example, if it is determined that the current jitter degree of the camera module is "no jitter", it may be determined that the camera module is in a tripod shooting mode, and then the reference photosensitivity may be determined to be a smaller value in order to obtain an image with higher quality, e.g., determining that the reference photosensitivity is 100. If it is determined that the current jitter degree of the camera module is "slight jitter", it may be determined that the camera module is in a hand-held shooting mode, and then the reference photosensitivity may be determined to be a greater value to reduce the shooting duration, e.g., determining that the reference photosensitivity is 200. If it is determined that the current jitter degree of the camera module is "small jitter", it may be determined that the camera module is in a hand-held shooting mode currently, and then the reference photosensitivity may be increased to reduce the shooting duration, e.g., determining that the reference photosensitivity is 220. If it is determined that the current jitter degree of the camera module is "large jitter", it may be determined that the current jitter degree is too large, and then the reference photosensitivity may be increased to reduce the shooting duration, e.g., the reference photosensitivity is determined to be 250.

In an exemplary implementation, the reference photosensitivity corresponding to each frame of images to be captured may be the same, i.e., based on the current degree of jitter of the camera module, it is determined that each frame of images to be captured corresponds to the same reference photosensitivity. In another exemplary implementation, the reference photosensitivity corresponding to multiple frames of images to be captured may be different, i.e., the reference photosensitivity corresponding to each frame of images to be captured may be determined from preset multiple ISO values based on the current degree of jitter of the camera module. For example, the reference photosensitivity corresponding to multiple frames of images to be captured may all be different, or the reference photosensitivity corresponding to multiple frames of images to be captured may be partially the same and partially different.

It should be noted that the above examples are only illustrative and should not be considered as limitations on the present disclosure. In practice, when the jitter degree of the camera module changes, the reference photosensitivity of the images to be captured can be changed according to the actual situation to obtain an optimal photosensitivity. The mapping relationship between the jitter degree of the camera module and the reference photosensitivity corresponding to each frame of images to be captured can be preset according to actual needs.

In action 105, according to the luminance of the current shooting scene, the reference photosensitivity corresponding to each frame of images to be captured, and a preset mode of exposure compensation, the exposure duration corresponding to each frame of images to be captured is determined.

Herein, the exposure duration refers to the amount of time that light passes through the lens.

In the implementation of the disclosure, the light metering module in the camera module can be used to obtain the luminance of the current shot scene, and the amount of exposure corresponding to the current luminance can be determined by using an algorithm of auto exposure control (AEC), and then the exposure duration corresponding to each frame of images to be captured can be determined according to the determined amount of exposure, the reference photosensitivity corresponding to each frame of images to be captured, and the preset mode of exposure compensation.

It should be noted that the amount of exposure is related to aperture, exposure duration and photosensitivity. Among them, the aperture, that is, the aperture through which light passes, determines the amount of light passing in a unit time. When the reference photosensitivity corresponding to each frame of images to be captured is the same and the size of aperture is the same, the greater the amount of exposure corresponding to the luminance of the current shot scene, the greater the exposure duration corresponding to each frame of images to be captured.

In an exemplary implementation, exposure duration corresponding to each frame of images to be captured is different, while in another exemplary implementation, the exposure duration corresponding to each frame of images to be captured is not all the same, for example, n values of exposure duration corresponding to m frames of images to be captured, m is a positive integer greater than 1, n is a positive integer and $1<n\leq m$. In an exemplary implementation, n equals m, it means that exposure durations corresponding to any two frames of images to be captured are different. In another exemplary implementation, n may be less than m, i.e., some images to be captured have the same exposure duration, but at least two frames of images to be captured have different exposure duration to obtain images with different dynamic ranges, so that the synthesized image has a higher dynamic range and improves the overall brightness and quality of the image. That is, in a possible implementation of the present disclosure, the above action 105 may include: determining a reference amount of exposure according to the luminance of the current shooting scene; determining a reference exposure duration according to the reference amount of exposure and the reference photosensitivity corresponding to each frame of images to be captured; according to the reference exposure duration and the preset mode of exposure compensation, the exposure duration corresponding to each frame of images to be captured, that is, the actual exposure duration used by the camera module when capturing the images, is determined.

The reference amount of exposure refers to a normal amount of exposure corresponding to the luminance of the current shooting scene, and the reference amount of exposure is determined according to the luminance of the current shooting scene. When the size of aperture is determined, the reference exposure duration can be determined according to the reference photosensitivity and the reference amount of exposure.

In an exemplary implementation of the present disclosure, an exposure compensation mode may be preset such that different strategies of exposure compensation can be adopted for each frame of images to be captured, so that the images to be captured corresponds to different amount of exposure to obtain images with different dynamic ranges. In another exemplary implementation, at least two frames of images to be captured may adopt different strategies of exposure compensation, so that the amount of exposure corresponding to the at least two frames of images to be captured are different to obtain images with different dynamic ranges.

The preset mode of exposure compensation may be a combination of exposure values (EVs) preset for each frame of images to be captured, i.e. each frame of images to be captured has a corresponding exposure value, and the combination of exposure values of all images to be captured constitutes the preset mode of exposure compensation, with at least two exposure values being different in the mode of exposure compensation. In the initial definition of exposure value, exposure value did not mean an accurate value, but "all combinations of camera apertures and exposure duration that can give a uniform amount of exposure". Photosensitivity, aperture and exposure duration determine the amount of exposure of the camera. Combinations of different parameters can produce equal amount of exposure, i.e., EVs of these different combinations are the same. For example, if the photosensitivity is the same, the amount of exposure obtained when using the combination of the exposure duration of $\frac{1}{125}$ second and the aperture of F11 is the same as the amount of exposure obtained when using the combination of the exposure duration of $\frac{1}{250}$ second and the F8 shutter, i.e., the EVs of these two combinations are the same. That the EV is 0 corresponds to the amount of exposure obtained when the ISO value is 100, the aperture factor is F1, and the exposure duration is 1 second; if the amount of exposure is increased by one gear, that is, the exposure duration is doubled, or the ISO value is doubled, or the aperture is increased by one gear, the EV is increased by 1, that is, the amount of exposure corresponding to 1 EV is twice the amount of exposure corresponding to 0 EV. Table 1 shows corresponding relationship between EV and exposure duration, aperture, and ISO value respectively when the exposure duration, the aperture, and the ISO value individually changes.

TABLE 1

The relationship between exposure duration and EV when the aperture factor is 1 and the ISO value is 100

| Exposure duration/second | | | | | | | | | | |
|---|---|---|---|---|---|---|---|---|---|---|
| 1 | ½ | ¼ | ⅛ | $\frac{1}{15}$ | $\frac{1}{30}$ | $\frac{1}{60}$ | $\frac{1}{125}$ | $\frac{1}{250}$ | $\frac{1}{500}$ | $\frac{1}{1000}$ |
| EV 0 | 1 | 2 | 3 | 4 | 5 | 6 | 7 | 8 | 9 | 10 |

The relationship between aperture factor and EV when the exposure duration is 1 second and the ISO value is 100

| Aperture factor | | | | | | | | | | |
|---|---|---|---|---|---|---|---|---|---|---|
| 1 | 1.4 | 2 | 2.8 | 4. | 5.6 | 8 | 11 | 16 | 22 | 32 |
| EV 0 | 1 | 2 | 3 | 4 | 5 | 6 | 7 | 8 | 9 | 10 |

The relationship between ISO value and EV when the exposure duration is 1 second and the aperture factor is 1

| ISO value | | | | | | | | | | |
|---|---|---|---|---|---|---|---|---|---|---|
| 100 | 200 | 400 | 800 | 1600 | 3200 | 6400 | / | / | / | / |
| EV 0 | 1 | 2 | 3 | 4 | 5 | 6 | / | / | / | / |

After the photography technology entered the digital age, the photometry function inside the camera has become very powerful. EV is often used to indicate a differential on the exposure scale. Many cameras allow exposure compensation to be set, and it is usually expressed in EV. In this case, EV refers to the difference value between the amount of exposure corresponding to camera photometry data and the actual amount of exposure. For example, exposure compensation of +1 EV refers to increasing the amount of exposure corresponding to camera photometry data by one gear, that is, the actual amount of exposure is twice the amount of exposure corresponding to camera photometry data.

In the implementation of the present disclosure, when presetting the mode of exposure compensation, the EV corresponding to the determined reference amount of exposure can be preset to 0, +1 EV means to increase amount of exposure by one gear, that is, the amount of exposure is 2 times the reference amount of exposure, +2 EV means to increase amount of exposure by two gears, that is, the amount of exposure is 4 times the reference amount of exposure, −1 EV means to decrease amount of exposure by one gear, that is, the amount of exposure is 0.5 times the reference amount of exposure, and so on.

For example, if the number of images to be captured is 7 frames, the combination of EVs corresponding to the preset mode of exposure compensation may be [+1, +1, +1, +1, 0, −2.5, −5]. The frame with the mode of exposure compensation of +1 EV is a light overexposure frame, which is used for overall noise reduction and can effectively improve the details of the dark part and suppress the noise of the dark part. Since when there is a face in the image, the AEC algorithm takes the region of the face as the target for photometry and calculates the reference amount of exposure, the frame with the mode of exposure compensation of 0 EV can be used as a reference for describing the brightness and details of the face. The frames with the modes of exposure compensation of −2.5 EV and −5 EV are two underexposure frames, which are used to enhance the highlight details of the bright part of the image, prevent the highlight objects (such as billboards, luminous characters, etc.) in the shot image from overexposure, and it can maintain the transition from the highlight to the dark area and maintain a good bright-dark transition effect.

In an exemplary implementation, the combination of EVs corresponding to the mode of exposure compensation comprises EVs for processing images to be captured with overexposure, EVs for processing images to be captured with normal exposure and EVs for processing images to be captured with underexposure; or, the combination of EVs corresponding to the mode of exposure compensation comprises EVs for processing images to be captured with normal exposure and EVs for processing images to be captured with underexposure; or, the combination of EVs corresponding to the mode of exposure compensation comprises EVs for processing images to be captured with overexposure and EVs for processing images to be captured with underexposure; or, the combination of EVs corresponding to the mode of exposure compensation comprises EVs for processing images to be captured with overexposure and EVs for processing images to be captured with normal exposure.

There may be one or more EVs (for example, 2, 3, 4 and so on) for processing (for example, positive compensation) images with underexposure in the combination of EVs, for example, the EV is "+1". There may be one or more EVs (for example, 2, 3, 4 and so on) for performing no exposure compensation on the images to be captured in the combination of EVs, for example, the EV is "0". There may be one or more EVs (for example, 2, 3, 4 and so on) for processing (for example, negative compensation) images with overexposure in the combination of EVs, for example, the EV is "−5" or "−2.5" etc.

The one or more EVs corresponding to the preset mode of exposure compensation can be set according to actual needs or according to a preset range of EVs or according to a principle that difference values between two adjacent EVs are equal, which is not limited in the implementations of this disclosure. The difference values between two adjacent EVs being equal means the difference values between EVs for processing images to be captured with overexposure being equal, or it can be understood that all EVs for processing images to be captured with overexposure may form one Arithmetic Progression with the initial value of 0. For example, the combination of EVs is [0, 0, 0, 0, −2, −4, −6], wherein "−2", "−4" and "−6" are EVs for processing images to be captured with overexposure, and the difference values between two adjacent EVs for processing images to be captured with overexposure are equal. For another example, the combination of EVs is [+1, +1, +1, +1, 0, −3, −6], wherein "−3" and "−6" are EVs for processing images to be captured with overexposure, and they together with the value "0" can form an Arithmetic Progression.

In a possible implementation of the present disclosure, the size of aperture may be unchanged and all images to be captured are captured using the determined reference photosensitivity. Therefore, after the reference exposure duration is determined according to the reference amount of exposure and the reference photosensitivity, the exposure duration corresponding to each frame of images to be captured can be determined according to the preset mode of exposure compensation and the reference exposure duration. For example, if the exposure compensation mode corresponding to the images to be captured is +1 EV, the exposure duration corresponding to the images to be captured is twice the reference duration; if the exposure compensation mode corresponding to the images to be captured is −1 EV, the exposure duration corresponding to the images to be captured is 0.5 times the reference duration, and so on.

For example, assuming that the number of images to be captured is 7 frames, the combination of EVs corresponding to the preset mode of exposure compensation may be [+1, +1, +1, +1, 0, −3, −6], and the reference exposure duration is determined to be 100 milliseconds based on the reference amount of exposure and the reference photosensitivity, then the exposure duration corresponding to the 7 images to be captured is 200 milliseconds, 200 milliseconds, 200 milliseconds, 200 milliseconds, 100 milliseconds, 12.5 milliseconds, and 6.25 milliseconds, respectively.

In other exemplary implementations, there may be a variety of preset modes of exposure compensation. In practice, the mode of exposure compensation corresponding to a current situation may be determined according to the real-time situation of the camera module. In a possible implementation of the present disclosure, before determining the exposure duration corresponding to each frame of images to be captured according to the reference exposure duration and the preset mode of exposure compensation, the method further includes: determining the preset mode of exposure compensation according to the current jitter degree of the camera module.

It can be understood that for a different current jitter degree of the camera module, a different mode of exposure compensation may be adopted so that the shooting duration can be adapted to the jitter degree and the image quality can be improved. Therefore, in a possible implementation of the present disclosure, the mapping relationship between the jitter degree of the camera module and the mode of exposure compensation can be preset to dynamically adjust the mode of exposure compensation according to the current jitter degree of the camera module.

For example, when the jitter degree of the camera module is within a range of G, the combination of EVs of the corresponding mode of exposure compensation may be [+1, +1, +1, +1, 0, −3, −5]. When the jitter degree of the camera module is within a range of H, the combination of EVs of the corresponding mode of exposure compensation may be [0, 0, 0, 0, −2, −4, −6].

In an exemplary implementation, if the camera module is currently in a different configuration mode, the reference amount of exposure determined according to the value of ambient luminance may be different. Therefore, the preset exposure compensation strategy may be determined according to a current configuration mode of the camera module. In a possible implementation of the present disclosure, determining the preset mode of exposure compensation may further include: determining that the preset mode of exposure compensation is a first mode according to the current jitter degree of the camera module when the camera module currently starts the automatic exposure function; or when the camera module does not start the automatic exposure function currently, determining that the preset mode of exposure compensation is a second mode according to the current jitter degree of the camera module, wherein the range of exposure compensation corresponding to the second mode is greater than the range of exposure compensation corresponding to the first mode.

The range of exposure compensation refers to the range between the minimum EV and the maximum EV in the combination of EVs of the mode of exposure compensation. The maximum EV may be less than or equal to 2 or equal to 1±1, and the minimum EV may be greater than or equal to −6. The absolute value of the difference value between the maximum EV and the minimum EV in the combination of EVs can be used to perform the comparison of the range of exposure compensation. The greater the absolute value of the difference is, the greater the range of exposure compensation is. When the maximum EVs in the combination of EVs of two modes of exposure compensation are the same, the range of exposure compensation of the mode of exposure compensation with a less minimum EV is larger. When the minimum EVs in the combination of EVs of two modes of exposure compensation are the same, the range of exposure compensation of the exposure compensation mode with a larger maximum EV is larger.

When it is detected that the camera module currently starts the automatic exposure function, the photometry module of camera module will automatically take the face area as the main area for photometry and determine the reference amount of exposure according to the photometry result of the face area. However, under a night scene mode or dark light mode, the luminance of the face area is usually low, resulting in the determined reference amount of exposure being higher than the reference amount of exposure determined when the automatic exposure function is not turned on. If too many overexposed frames are still captured when the face is included, the face area will be easily overexposed, resulting in the poor effect of the target image. Therefore, for the same degree of jitter, the corresponding exposure compensation mode of the camera module, when the automatic exposure function has been turned on, needs to have a lower range of exposure compensation than when the automatic exposure function is not turned on.

In a possible implementation of the present disclosure, different exposure compensation strategies can be adopted for the same degree of jitter according to whether the camera module currently turns on the automatic exposure function. Therefore, for the same degree of jitter, it may correspond to multiple modes of exposure compensation. For example, the jitter degree of the camera module is "slight jitter", and the corresponding preset mode of exposure compensations are mode P and mode Q, where the combination of EVs corresponding to mode P is [0, 0, 0, 0, −2, −4, −6] and the combination of EVs corresponding to mode Q is [+1, +1, +1, +1, 0, −3, −6]. After determining the current jitter degree of the camera module and according to whether the camera module currently turns on the function of automatic exposure, the preset mode of exposure compensation consistent with the current situation can be determined.

For example, assuming that the current jitter degree of the camera module is "slight jitter", the corresponding preset mode of exposure compensations are mode P and mode Q, wherein the combination of EVs corresponding to mode P is [0, 0, 0, 0, −2, −4, −6] and the combination of EVs corresponding to mode Q is [+1, +1, +1, +1, 0, −3, −6], it can be seen that the range of exposure compensation of mode P is less than the range of exposure compensation of mode Q. If it is detected that the camera module currently turns on the function of automatic exposure, it is determined that the preset mode of exposure compensation is mode P (i.e. the first mode), that is, the combination of EVs is [0, 0, 0, 0, −2, −4, −6]; if it is detected that the camera module currently does not turn on the function of automatic exposure, it is determined that the preset mode of exposure compensation is mode Q (i.e. the second mode), that is, the combination of EVs is [+1, +1, +1, +1, 0, −3, −6].

In an exemplary implementation, the performance of components in the camera module may also affect the mode of exposure compensation. In a possible implementation of the present disclosure, attribute information of one or more components in the camera module may be determined before the preset mode of exposure compensation is determined; and according to the attribute information of the one or more components and the current jitter degree, a preset mode of exposure compensation is determined. For example, for different sensors, apertures, shutters, lenses and different AEC algorithms, the EVs corresponding to exposure compensation modes may be different.

In action 106, a plurality of frames of images are sequentially captured according to the reference photosensitivity and exposure duration corresponding to each frame of images to be captured.

In action 107, the synthesis processing is performed on the captured plurality of frames of images to generate a target image.

In the implementation of the disclosure, after determining the reference photosensitivity and exposure duration corresponding to each frame of images to be captured, multiple frames of images can be acquired in sequence according to the reference photosensitivity and exposure duration for each frame, and the acquired multiple frames of images are combined to generate a target image.

In an exemplary implementation, different weight values may be set for each frame of image to obtain the target image with the best effect when performing synthesis processing on the acquired multiple frames of images. That is, in a possible implementation of the present disclosure, the action 107 may include: according to the weight value preset for each frame of images to be captured, the multiple frames of images are synthesized.

In action 108, shooting is performed in the first preset shooting mode.

In action 109, shooting is performed in the second preset shooting mode.

In the exemplary implementation shown in FIG. 1, the first preset shooting mode refers to the shooting mode adopted by the camera module when the jitter degree of the camera module is less than the first threshold, such as a normal night scene shooting mode and a tripod night scene shooting mode. The second preset shooting mode refers to the shooting mode adopted by the camera module when the jitter degree of the camera module is greater than the first threshold and the image currently captured by the camera module does not contain a face, such as a hand-held night scene shooting mode. In other exemplary implementations, the first and second preset shooting modes may be other shooting modes.

According to the image processing method provided by the exemplary implementation of the disclosure, when the shooting scene contains a face, the reference photosensitivity corresponding to each frame of images to be captured is determined according to the current jitter degree of the camera module, and the exposure duration corresponding to each frame of images to be captured is determined according to the luminance of the current shooting scene and the preset mode of exposure compensation, then the shot images with different exposure durations are synthesized, so that not only the overall dynamic range and the face brightening effect of the shot portrait image are improved, but also overexposure and brightness distortion in bright areas of the scene are avoided, the visual effect of the portrait image is improved, and the user experience is improved.

In a possible implementation of the disclosure, the time ranges of exposure duration corresponding to the images to be captured can be preset according to the performance of the camera module, and if the exposure duration corresponding to a determined image to be captured is not within the preset time range, the exposure duration corresponding to the image to be captured can be modified to minimize the shooting duration while ensuring the image quality, thus avoiding that the exposure duration is too long or too short and affects the quality of the acquired image.

Next, an image processing method according to another exemplary implementation of the present disclosure will be described with reference to FIG. 2.

Figure 2:
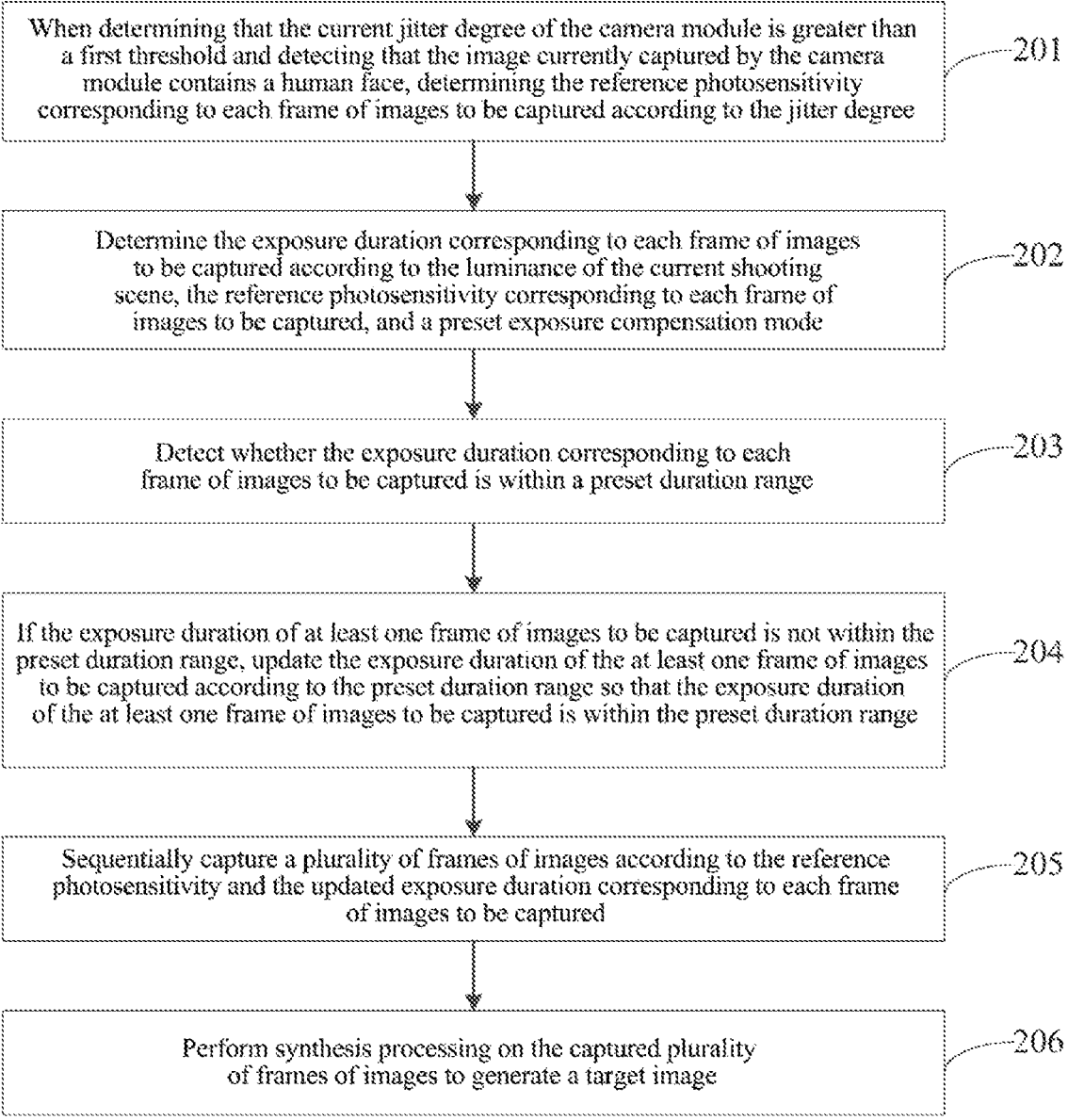
FIG. 2 is a flowchart of another image processing method according to an implementation of the present disclosure.

FIG. 2 is a flowchart of an image processing method according to another exemplary implementation of the present disclosure. As shown in FIG. 2, the image processing method may include actions 201 to 206.

In action 201, when it is determined that a current jitter degree of the camera module is greater than a first threshold and it is detected that an image currently captured by the camera module contains a human face, the reference photosensitivity corresponding to each frame of images to be captured is determined according to the jitter degree.

In an exemplary implementation, in the action 201, the reference photosensitivity corresponding to each frame of images to be captured may be determined according to the current jitter degree of the camera module when it is detected that an image currently captured by the camera module contains a human face under preset conditions. Details of the preset conditions are already described in previous implementations, and will not be repeated here.

In action 202, according to the luminance of the current shooting scene, the reference photosensitivity corresponding to each frame of images to be captured, and a preset mode of exposure compensation, the exposure duration corresponding to each frame of images to be captured is determined.

Previous implementations may be referred to for details of the implementation process and principle of the actions 201-202, which will not be repeated here.

In action 203, it is determined whether the exposure duration corresponding to each frame of images to be captured is within a preset range of exposure duration.

In order to minimize the jitter during hand-held shooting, when the camera module is detected to have jitter, according to the current jitter degree of the camera module, the shooting duration will be compressed as much as possible under the premise of ensuring the image quality, i.e., the exposure duration of each frame of image will be reasonably compressed to be within a tolerable limit range.

In this exemplary implementation, firstly, the reference photosensitivity is determined according to the current jitter degree of the camera module, and then the reference exposure duration is determined according to the luminance of the current shooting scene and the reference photosensitivity. The reference exposure duration is generally within a preset range of exposure duration. After that, the exposure duration corresponding to each frame of images to be captured can be determined according to the preset mode of exposure compensation and the reference exposure duration. However, since the exposure duration corresponding to each frame of images to be captured is calculated according to the preset mode of exposure compensation and the reference exposure duration, the exposure duration corresponding to one or more frames of images to be captured may exceed the preset range of exposure duration, resulting in an unsatisfactory image effect.

For example, if the exposure duration corresponding to a frame of images to be captured is greater than the preset maximum duration, i.e. the maximum value of the preset range of exposure duration, it may not only cause the frame of image to include ghosting, but also lengthen the overall shooting duration. If the exposure duration corresponding to a frame of images to be captured is less than the preset minimum duration, i.e. the minimum value of the preset range of exposure duration, it may cause excessive noise in the frame of image without capturing effective imaging information.

After determining the exposure duration corresponding to each frame of images to be captured, the exposure duration corresponding to each frame of images to be captured may be compared with the preset range of exposure duration to determine whether the exposure duration corresponding to each frame of images to be captured is within the preset range of exposure duration.

In an exemplary implementation, the exposure duration range may be preset according to an actual situation, and the limit range that the camera module can tolerate may be related to the arrangement of components in the camera module. In a possible implementation of the present disclosure, before the action 203, the method may further include: determining the preset range of exposure duration according to whether the camera module has an optical image stabilization function or not.

The optical image stabilization (OIS) means that for cameras or other similar imaging instruments, the instrument jitter in the process of capturing optical signals is avoided or reduced through the configuration of optical components, such as lens configuration, so as to improve the imaging quality. For example, if the components in the camera module are configured in a lens moving mode or a CCD (charge coupled device) moving mode, these configuration modes can compensate the light path where vibration occurs through the movable components, thus reducing the effect of photo blur. That is, the camera module can cancel some of the jitter by itself, so compared with a camera module that cannot perform optical image stabilization, the image captured by the camera module with the optical image stabilization function has less ghosting and blurring under the same degree of jitter. Therefore, compared with the camera module that cannot perform optical image stabilization, the preset range of exposure duration for the camera module with the optical image stabilization function, especially the upper limit of the duration range, i.e. the maximum value of preset duration, can be appropriately extended to obtain a better image quality.

In action 204, if the exposure duration of at least one frame of images to be captured is not within the preset range of exposure duration, the exposure duration of the at least one frame of images to be captured is updated according to the preset range of exposure duration so that the exposure duration of the at least one frame of images to be captured is within the preset range of exposure duration.

In the exemplary implementation of the present disclosure, if the exposure duration of an image to be captured is not within the preset range of exposure duration, the exposure duration of the image to be captured can be updated according to the preset range of exposure duration so that the updated exposure duration is within the preset range of exposure duration.

For example, assuming that the preset range of exposure duration is from 10 ms to 200 ms and the number of images to be captured is 7 frames, the determined exposure durations corresponding to each frame of images to be captured are 220 ms, 220 ms, 220 ms, 220 ms, 100 ms, 12.5 ms and 6.25 ms respectively, the exposure durations of the first 4 frames of the images to be captured and the exposure duration of the 7th frame of the images to be captured are not within the preset range of exposure duration, so the exposure durations of the first 4 frames can be updated to 200 ms from 220 ms, and the exposure duration of the 7th frame can be updated to 10 ms from 6.25 ms.

In an exemplary implementation, after updating the exposure duration of an image to be captured whose exposure duration is not within the preset range of exposure duration, the amount of exposure may change, which may cause the exposure duration of the image to be captured whose exposure duration is updated to be equal to or similar to that of another image to be captured whose exposure duration is not updated, i.e., the amount of exposure is equal to or similar, resulting in a change in the exposure compensation mode, and ultimately resulting in the acquired target image not meeting an expectation. Therefore, after updating the exposure duration of an image to be captured, exposure duration and photosensitivity of other frame of the images to be captured may be modified according to the difference value between the exposure duration before the update and that after the update. In an exemplary implementation of the present disclosure, after the above action 204, the method may further include: determining an exposure adjustment mode corresponding to each frame of the images to be captured according to the difference value between the exposure duration of the at least one frame of the images to be captured before the update and that after the update; and according to the exposure adjustment mode, a photosensitivity of each frame of images to be captured is adjusted and exposure durations of other frames of images to be captured other than the at least one frame of images to be captured with updated exposure duration are adjusted.

In a possible implementation of the present disclosure, a fourth threshold for the difference value of the exposure duration can be preset. If the difference value between the exposure duration of an image to be captured before the update and that after update is greater than the fourth threshold, the mode of exposure adjustment corresponding to each frame of images to be captured can be determined as "Adjust", and the exposure duration of other frames can be correspondingly modified according to the difference value between the exposure duration of the image to be captured before the update and that after the update, so that the difference value between the amount of exposure of the two adjacent images to be captured is the same as that before the update. If the difference value between the exposure duration of an image to be captured before the update and that after the update is less than the fourth threshold, the difference value between the exposure of the images to be captured before the update and that after the update can be considered as small and negligible, and accordingly, the exposure adjustment mode corresponding to each image to be captured is determined as "Not Adjust".

In another exemplary implementation, the exposure adjustment mode may not be set, and after the action 204, the method may further include: according to the difference value between the exposure duration of the at least one frame of images to be captured before the update and that after the update, determine whether a preset condition for adjustment is satisfied, and when the preset condition for adjustment is satisfied, a photosensitivity of each frame of images to be captured is adjusted and exposure durations of other frames of images to be captured except the at least one frame of images to be captured with the updated exposure duration are adjusted.

The preset condition for adjustment may be that the difference value between the exposure durations of the at least one frame of images to be captured before the update and that after the update is greater than the threshold of the difference value of the exposure duration. When the difference value between the exposure duration of the at least one frame of images to be captured before the update and that after the update is greater than the threshold of the difference value of the exposure duration, the preset condition for adjustment is considered to be satisfied.

After updating exposure durations of frames of images to be captured according to the difference value between the exposure duration of an image to be captured before update and that after update, it is probable that some of the exposure durations of the images to be captured after the update are not within the preset range of exposure duration. Therefore, the exposure duration and photosensitivity of the images to be captured can be adjusted at the same time so that the updated exposure durations of the images to be captured are within the preset range of exposure duration.

For example, assume that the preset range of exposure duration is from 10 ms to 200 ms, and the fourth threshold is 20 ms. The number of images to be captured is 7 frames and the reference photosensitivity is 100. The exposure duration of each frame of images to be captured before the update is 230 ms, 230 ms, 230 ms, 230 ms, 150 ms, 50 ms and 12.5 ms. The exposure duration of 230 ms of the first 4 frames is not within the preset range of exposure duration, and thus the exposure duration of the first 4 frames is updated to 200 ms from 230 ms, that is, the updated exposure duration of each frame of images to be captured is 200 ms, 200 ms, 200 ms, 200 ms, 150 ms, 50 ms and 12.5 ms respectively. It can be seen that the difference value between the exposure duration of the first four frames of images to be captured before the update and that after the update is 30 ms, which is greater than the fourth threshold of 20 ms. Therefore, in order to ensure the change trend of amount of exposure of all images to be captured, the photosensitivity of each frame and the exposure durations of the last three frames need to be adjusted, and thus the mode of exposure adjustment is determined to be "Adjust", e.g., adjusting the photosensitivity of the first four frames of images to be captured to be (100×230)/200=115 ms, i.e., keeping the amount of exposure constant, it satisfies: photosensitivity after adjustment=amount of exposure/exposure duration after adjustment, where amount of exposure=photosensitivity before adjustment*exposure duration before adjustment. Accordingly, the exposure duration of the fifth frame of images to be captured is adjusted to be (100×150)/115=3000/23 milliseconds, and the exposure duration of the sixth frame of images to be captured is adjusted to be (100×50)/115=1000/23 milliseconds, and the exposure duration of the seventh frame of images to be captured is adjusted to be (100×12.5)/115=250/23 milliseconds. In the above exemplary implementation, the ISO values of all images to be captured are the same. In other exemplary implementations, there may be an ISO value of an image to be captured that is different from the ISO values of other images to be captured.

If the exposure durations of multiple frames of images to be captured are updated according to the preset range of exposure duration, as long as the difference value between the exposure duration of an frame of images to be captured before and after the update is greater than the fourth threshold, the mode of exposure adjustment will be entered or the preset condition for adjustment will be considered to be satisfied. After that, the photosensitivity of the at least one frame of images to be captured with the updated exposure duration is adjusted, and the exposure durations of other frames are adjusted according to the adjusted photosensitivity.

It should be noted that the above examples are only illustrative and should not be considered as limitations on the present disclosure. In practice, a fourth threshold can be preset according to actual needs, which is not limited in implementations of this disclosure.

In action 205: multiple frames of images are sequentially captured according to the reference photosensitivity and the updated exposure duration corresponding to each frame of images to be captured.

In action 206, the captured multiple frames of images are synthesized to generate a target image.

Details of the implementation process and principle of the actions 205-206 have been described in detail in previous implementations, and will not be repeated here.

According to the image processing method provided by the implementation of the disclosure, when a shooting scene contains a human face, the reference photosensitivity corresponding to each frame of images to be captured is determined according to the current jitter degree of the camera module, the exposure duration corresponding to each frame of images to be captured is determined according to the luminance of the current shooting scene and the preset mode of exposure compensation, and the exposure duration corresponding to an image to be captured whose exposure duration exceeds the preset range of exposure duration is updated according to the preset range of exposure duration, so that not only the exposure duration corresponding to each frame of images to be captured is within the preset range, but also each frame of images to be captured is captured according to the preset mode of exposure compensation, which improves the quality of portrait shooting images and improves the user experience.

An exemplary implementation of the present disclosure also provides an image processing apparatus.

Figure 3:
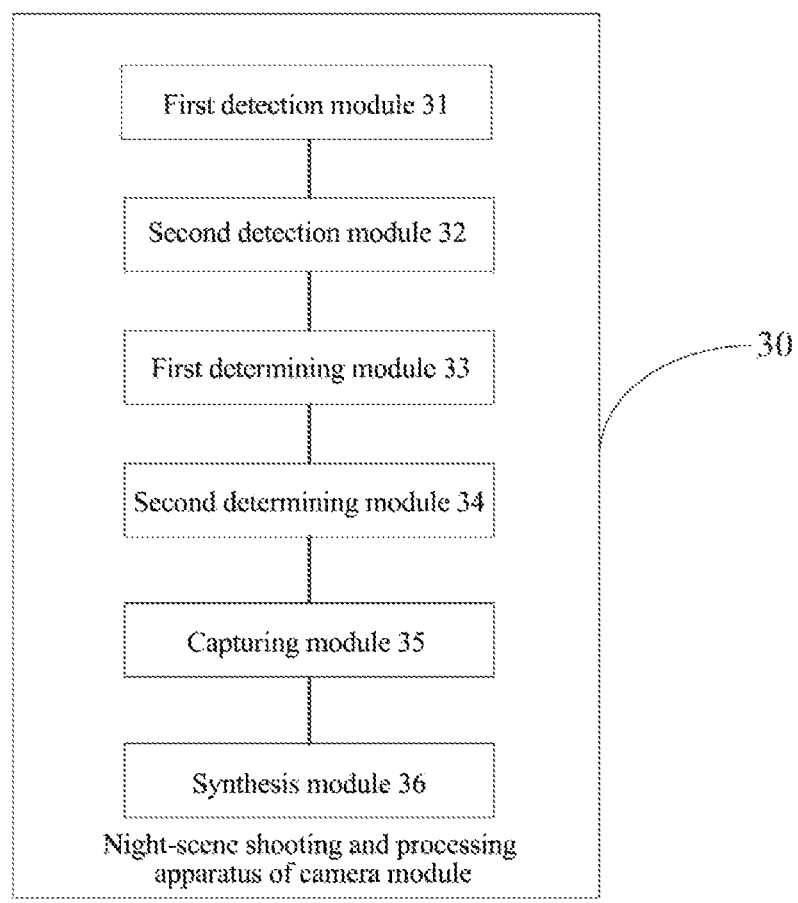
FIG. 3 is a schematic structural diagram of an image processing apparatus according to an implementation of the present disclosure.

FIG. 3 is a schematic structural diagram of an image processing apparatus according to an exemplary implementation of the present disclosure.

As shown in FIG. 3, the image processing apparatus 30 includes a first detection module 31, a second detection module 32, a first determining module 33, a second determining module 34, a capturing module 35, and a synthesis module 36.

The first detection module 31 is configured to detect the current jitter degree of the camera module under a night scene shooting mode.

The second detection module 32 is configured to detect whether the image currently acquired by the camera module contains a human face when the jitter degree is greater than the first threshold.

The first determining module 33 is configured to determine the reference photosensitivity corresponding to each frame of images to be captured according to the current jitter degree of the camera module when the image currently captured by the camera module contains a human face.

The second determining module 34 is configured to determine the exposure duration corresponding to each frame of images to be captured according to the luminance of the current shooting scene, the reference photosensitivity corresponding to each image to be captured, and a preset mode of exposure compensation.

The capturing module 35 is configured to sequentially capture multiple frames of images according to the reference photosensitivity and exposure duration corresponding to each frame of images to be captured.

The synthesis module 36 is configured to perform synthesis processing on the captured multiple frames of images to generate a target image.

In another exemplary implementation of the present disclosure, the image processing apparatus 30 may include a first determining module 33', a second determining module 34', a capturing module 35', and a synthesis module 36'.

The first determining module 33' is configured to determine the reference photosensitivity corresponding to each frame of images to be captured according to the current jitter degree of the camera module when it is detected, under a preset condition, that the image currently captured by the camera module contains a human face.

The second determining module 34' is configured to determine the exposure duration corresponding to each frame of images to be captured according to the luminance of the current shooting scene, the reference photosensitivity corresponding to each frame of images to be captured, and the preset mode of exposure compensation.

The capturing module 35' is configured to sequentially capture multiple frames of images according to the reference photosensitivity and exposure duration corresponding to each frame of images to be captured.

The synthesis module 36' is configured to perform synthesis processing on the captured multiple frames of images to generate a target image.

In practice, the image processing apparatus provided by the exemplary implementation of the present disclosure may be configured in any electronic device to perform the aforementioned image processing method.

The image processing apparatus provided by the implementation of the disclosure determines the reference photosensitivity corresponding to each frame of images to be captured according to the current jitter degree of the camera module when the shooting scene contains a face, and determines the exposure duration corresponding to each frame of images to be captured according to the luminance of the current shooting scene and the preset mode of exposure compensation, and the shot images with different exposure durations are synthesized, so that not only the overall dynamic range and the face brightening effect of the shot portrait image are improved, but also overexposure and brightness distortion in the bright areas of the scene are avoided, the visual effect of the portrait image is improved, and the user experience is improved.

In a possible implementation of the present disclosure, the image processing apparatus 30 is configured to: determine whether the exposure duration corresponding to each frame of images to be captured is within a preset range of exposure duration; if the exposure duration of at least one frame of images to be captured is not within the preset range of exposure duration, update the exposure duration of the at least one frame of images to be captured according to the preset range of exposure duration, so that the exposure duration of the at least one frame of images to be captured is within the preset range of exposure duration.

In an exemplary implementation, the image processing apparatus 30 may also be configured to: determine the preset range of exposure duration according to whether the camera module has an optical image stabilization function or not.

In an exemplary implementation, the image processing apparatus 30 is further configured to: determine an exposure adjustment mode corresponding to each frame of the images to be captured according to the difference value between the exposure duration of the at least one frame of the images to be captured before the update and the exposure duration of the at least one frame of the images to be captured after the update; and according to the exposure adjustment mode, adjust a photosensitivity of each frame of images to be captured and exposure durations of other frames of images to be captured other than the at least one frame of images to be captured with updated exposure duration.

In an exemplary implementation, the image processing apparatus 30 may also be configured to: according to the difference value between the exposure duration of the at least one frame of images to be captured before the update and that after the update, determine whether a preset condition for adjustment is satisfied, and when the preset condition for adjustment is satisfied, adjust the photosensitivity of each frame of images to be captured and the exposure durations of other frames of images to be captured except the at least one frame of images to be captured with the updated exposure duration.

In an exemplary implementation, the second determining module 34 or second determining module 34' is configured to: determine a reference amount of exposure according to the luminance of the current shooting scene; determine a reference exposure duration according to the reference amount of exposure and the reference photosensitivity corresponding to each frame of images to be captured; according to the reference exposure duration and the preset mode of exposure compensation, determine the exposure duration corresponding to each frame of images to be captured.

In an exemplary implementation, the second determining module 34 or the second determining module 34' described above is further configured to: determine the preset mode of exposure compensation according to the current jitter degree of the camera module.

In an exemplary implementation, the second determining module 34 or the second determining module 34' described above is further configured to: determine that the preset mode of exposure compensation is a first mode according to the current jitter degree of the camera module when the camera module currently starts the automatic exposure function; or determine that the preset mode of exposure compensation is a second mode according to the current jitter degree of the camera module when the camera module currently does not start the automatic exposure function; wherein the range of exposure compensation corresponding to the second mode is greater than the range of exposure compensation corresponding to the first mode.

In an exemplary implementation, the second determining module 34 or the second determining module 34' is further configured to: determine attribute information of one or more components of the camera module; determine the preset mode of exposure compensation according to the attribute information of the one or more components and the current jitter degree.

In an exemplary implementation, the synthesis module 36 or synthesis module 36' is configured to: synthesize the multiple frames of images according to a preset weight value corresponding to each frame of images to be captured.

It should be noted that the foregoing explanation of the exemplary implementations of the image processing method also applies to the image processing apparatus 30 of this implementation, and will not be repeated here.

According to the image processing device provided by the implementation of the disclosure, when a shooting scene contains a human face, the reference photosensitivity corresponding to each frame of images to be captured is determined according to the current jitter degree of the camera module, the exposure duration corresponding to each frame of images to be captured is determined according to the luminance of the current shooting scene and the preset mode of exposure compensation, and the exposure duration corresponding to an image to be captured whose exposure duration exceeds the preset range of exposure duration is updated according to the preset range of exposure duration, so that not only the exposure duration corresponding to each frame of images to be captured is within the preset range, but also each frame of images to be captured is captured according to the preset mode of exposure compensation, which improves the quality of portrait image and user experience.

An exemplary implementation of the present disclosure also provides an electronic device.

Figure 4:
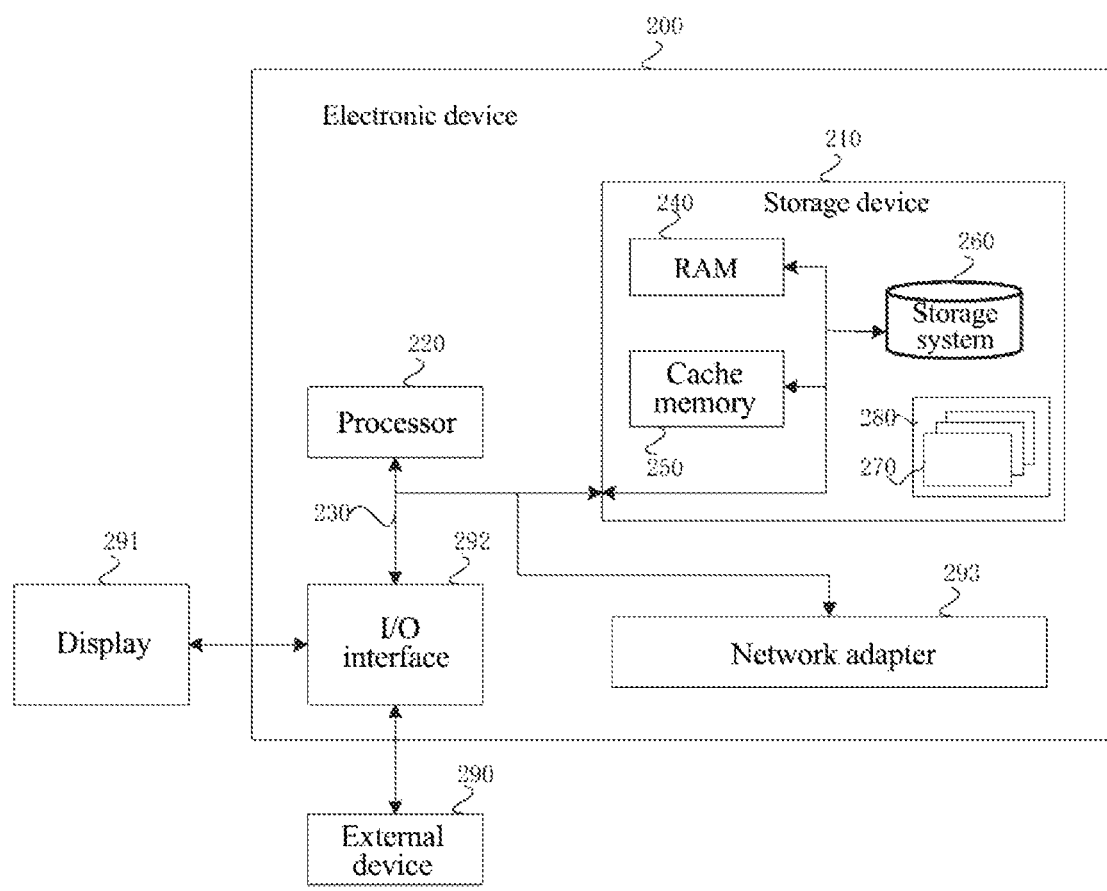
FIG. 4 is a schematic structural diagram of an electronic device according to an implementation of the present disclosure.

FIG. 4 is a schematic structural diagram of an electronic device according to an exemplary implementation of the present disclosure.

As shown in FIG. 4, the electronic device 200 includes a storage device 210 and a processor 220, wherein the storage device 210 stores a computer program that is executable by the processor 220 to implement the image processing method described in the exemplary implementations of the present disclosure.

In an exemplary implementation, the electronic device 200 may further include a camera module.

In an exemplary implementation, the electronic device 200 may also include a bus 230 connecting different components (including the storage device 210 and the processor 220). Bus 230 represents one or more of several types of bus structures, including a storage device bus or storage device controller, a peripheral bus, a graphics acceleration port, a processor, or a local bus using any of a variety of bus structures. For example, these architectures include, but are not limited to, Industry Standard Architecture (ISA) bus, Micro Channel Architecture (MAC) bus, Enhanced ISA bus, video electronics standards association (VESA) local bus, and Peripheral Component Interconnect (PCI) bus.

Electronic device 200 typically includes a variety of electronic device readable media. These media can be any available media that can be accessed by the electronic device 200, including volatile and nonvolatile media, removable and non-removable media.

Storage device 210 may also include computer system readable media in the form of volatile memory, such as random access memory (RAM) 240 and/or cache memory 250. The electronic device 200 may include other removable or non-removable, volatile or nonvolatile computer system storage media. By way of example only, the storage system 260 may be configured to read and write non-removable, nonvolatile magnetic media (not shown in FIG. 4, commonly referred to as a "hard disk drive"). Although not shown in FIG. 4, a magnetic disk drive for reading from and writing into a removable non-transitory magnetic disk (e.g., "floppy disk") and an optical disk drive for reading from and writing into a removable non-transitory optical disk (e.g., CD-rom, DVD-rom, or other optical media) may be provided. In these cases, each drive may be connected to bus 230 through one or more data media interfaces. The storage device 210 may include at least one program product having a set (e.g., at least one) of program modules configured to perform the functions of any exemplary implementation of the present disclosure.

A program or utility 280 having a group (at least one) of program modules 270 including, but not limited to, an operating system, one or more disclosure programs, other program modules, and program data may be stored in, for example, storage device 210, and an implementation of a network environment may be included in each or some combination of these examples. Program module 270 generally performs functions and/or methods in the exemplary implementations described herein.

The electronic device 200 may also communicate with one or more external devices 290 (e.g., keyboard, pointing device, display 291, etc.), with one or more devices that enable a user to interact with the electronic device 200, and/or with any device that enables the electronic device 200 to communicate with one or more other computing devices (e.g., network card, modem, etc.). This communication may be through an input/output (I/O) interface 292. Also, the electronic device 200 may also communicate with one or more networks (e.g., one or more of the following networks: a local area network (LAN), a wide area network (WAN), and a public network, e.g., the internet) through the network adapter 293. As shown, network adapter 293 communicates with other modules of electronic device 200 via bus 230. It should be understood that although not shown in the figure, other hardware and/or software modules may be used in conjunction with the electronic device 200, including but not limited to microcode, device drivers, redundant processing units, external disk drive arrays, RAID systems, tape drives, data backup storage systems, etc.

The processor 220 executes each functional disclosure and data processing by running programs stored in the storage device 210.

It should be noted that the implementation process and technical principle of the electronic device of this exemplary implementation are described in the foregoing explanation of the image processing method in the exemplary implementations of this disclosure and will not be repeated here.

The electronic device provided by the implementation of the disclosure can perform the image processing method as described above. When a shooting scene contains a face, the reference photosensitivity corresponding to each frame of images to be captured is determined according to the current jitter degree of the camera module, and the exposure duration corresponding to each frame of images to be captured is determined according to the luminance of the current shooting scene and a preset mode of exposure compensation, so that a plurality of images with different exposure durations are synthesized, and thus not only the overall dynamic range and face brightening effect of a shot portrait image are improved, but also overexposure and brightness distortion in the bright areas of the scene are avoided, the visual effect of the portrait image is improved, and the user experience is improved An exemplary implementation of the disclosure provides a non-transitory computer readable storage medium storing a computer program that is executable by a processor to implement the image processing method described in the exemplary implementations of the present disclosure.

An exemplary implementation of the present disclosure also provides a computer program which is executable by a processor to implement the image processing method described in the exemplary implementations of the present disclosure.

In an exemplary implementation, any combination of one or more computer-readable media may be used. The computer readable medium may be a computer readable signal medium or a computer readable storage medium. The computer readable storage medium may be, for example, but not limited to, an electrical, magnetic, optical, electromagnetic, infrared, or semiconductor system, apparatus, or device, or any combination thereof. Examples of computer readable storage media (a non-exhaustive list) include electrical connections with one or more wires, portable computer disks, hard disks, random access memory (RAM), read only memory (ROM), erasable programmable read only memory (EPROM or flash memory), optical fibers, portable compact disk read only memory (CD-ROM), optical storage devices, magnetic storage devices, or any suitable combination of the above. In this disclosure, a computer readable storage medium may be any tangible medium containing or storing a program that may be used by or in connection with an instruction execution system, apparatus, or device.

The computer readable signal medium may include a data signal propagated in baseband or as part of a carrier wave, in which computer readable program code is carried. Such propagated data signals may take many forms, including, but not limited to, electromagnetic signals, optical signals, or any suitable combination of the above. The computer-readable signal medium may be any computer-readable medium other than a computer-readable storage medium that can send, propagate, or transport programs for use by or in connection with an instruction execution system, apparatus, or device.

Program code contained on a computer readable medium may be transmitted using any suitable medium, including, but not limited to, wireless, wire, fiber optic cable, RF, etc., or any suitable combination thereof.

Computer program code for performing the operations of implementations of the present invention may be written in one or more programming languages or combinations thereof, including object-oriented programming languages such as Java, Small Talk, C++, as well as conventional procedural programming languages such as "C" or similar programming languages. The program code may be executed entirely on the user electronic device, partially on the user electronic device, as a separate software package, partially on the user electronic device, partially on the remote electronic device, or entirely on the remote electronic device or server. In the case of a remote electronic device, the remote electronic device may be connected to the user electronic device through any kind of network, including a local area network (LAN) or a wide area network (WAN), or may be connected to an external electronic device (e.g., via the internet using an internet service provider).

Other implementations of the present disclosure will be readily apparent to those skilled in the art after reading the specification and practicing the implementations of the present disclosure. This disclosure is intended to cover any variations, uses, or adaptations of this disclosure that follow the general principles of this disclosure and include common knowledge or conventional technical means in the technical field that are not described in this disclosure. The specification and examples are to be regarded as exemplary only, with the true scope and spirit of the disclosure being indicated by the claims.

It should be understood that the present disclosure is not limited to the specific structure already described above and shown in the drawings, and that various modifications and changes may be made without departing from its scope. The scope of this disclosure is limited only by the appended claims.

What is claimed is:
1. A method for images processing, comprising:
when detecting that an image currently captured by a camera module contains a human face, determining a reference photosensitivity corresponding to each frame of images to be captured according to a current jitter degree of the camera module;
determining an exposure duration corresponding to the each frame of the images to be captured according to luminance of a current shooting scene, the reference photosensitivity corresponding to the each frame of the images to be captured, and a preset mode of exposure compensation, wherein the preset mode of exposure compensation is a combination of exposure values (EVs) preset for the each frame of the images to be captured, and the combination of EVs corresponding to the present mode of exposure compensation comprises EVs for processing images to be captured with overexposure, EVs for processing images to be captured with normal exposure and EVs for processing images to be captured with underexposure;
capturing a plurality of frames of images in sequence according to the reference photosensitivity and the exposure duration corresponding to the each frame of the images to be captured; and
performing synthesis processing on the captured plurality of frames of images to generate a target image.

2. The method of claim 1, wherein the image currently captured by the camera module is detected under a preset condition, and the preset condition comprises one of following:
a value of ambient luminance of the current shooting scene is less than a preset threshold, and the current jitter degree of the camera module is greater than a first threshold;

the value of ambient luminance of the current shooting scene is less than the preset threshold; and the current jitter degree of the camera module is greater than the first threshold.

3. The method of claim 1, further comprising:

determining whether the exposure duration corresponding to the each frame of the images to be captured is within a preset range of exposure duration; and when an exposure duration of at least one frame of the images to be captured is not within the preset range of exposure duration, updating the exposure duration of the at least one frame of the images to be captured according to the preset range of exposure duration to guarantee that the updated exposure duration of the at least one frame of the images to be captured is within the preset range of exposure duration.

4. The method of claim 3, further comprising:

determining the preset range of exposure duration according to whether the camera module has an optical image stabilization function or not.

5. The method of claim 3, further comprising:

according to a difference value between the exposure duration of the at least one frame of the images to be captured before the update and that after the update, determining whether a preset condition for adjustment is satisfied, and when the preset condition for adjustment is satisfied, adjusting a photosensitivity of the each frame of the images to be captured and adjusting exposure durations of other frames of the images to be captured except the at least one frame of the images to be captured whose exposure duration has been updated.

6. The method of claim 5, wherein the preset condition for adjustment comprises:

the difference value between the exposure duration of the at least one frame of the images to be captured before the update and that after the update is greater than a threshold of difference value of exposure duration.

7. The method of claim 1, wherein determining the exposure duration corresponding to the each frame of the images to be captured according to the luminance of the current shooting scene, the reference photosensitivity corresponding to the each frame of the images to be captured, and wherein the preset mode of exposure compensation comprises:

determining a reference amount of exposure according to the luminance of the current shooting scene;

determining a reference exposure duration according to the reference amount of exposure and the reference photosensitivity corresponding to the each frame of the images to be captured; and determining the exposure duration corresponding to the each frame of the images to be captured according to the reference exposure duration and the preset mode of exposure compensation.

8. The method of claim 7, further comprising:

determining the preset mode of exposure compensation according to the current jitter degree of the camera module.

9. The method of claim 8, wherein determining the preset mode of exposure compensation comprises:

determining that the preset mode of exposure compensation is a first mode according to the current jitter degree of the camera module when the camera module currently starts an automatic exposure function; or determining that the preset mode of exposure compensation is a second mode according to the current jitter degree of the camera module when the camera module currently does not start the automatic exposure function;

wherein a range of exposure compensation corresponding to the second mode is greater than a range of exposure compensation corresponding to the first mode.

10. The method of claim 8, further comprising:

determining attribute information of one or more components of the camera module;

wherein the determining the preset mode of exposure compensation comprises determining the preset mode of exposure compensation according to the attribute information of the one or more components and the current jitter degree of the camera module.

11. The method of claim 1, wherein performing synthesis processing on the captured plurality of frames of images comprises:

performing synthesis processing on the captured plurality of frames of images according to a preset weight value corresponding to each frame in the plurality of frames of images.

12. An electronic device comprising a storage device and a processor, wherein the storage device stores processor-readable instructions that are executable by the processor to perform actions of:

when detecting that an image currently captured by a camera module contains a human face, determining a reference photosensitivity corresponding to each frame of images to be captured according to a current jitter degree of the camera module;

determining an exposure duration corresponding to the each frame of the images to be captured according to luminance of a current shooting scene, the reference photosensitivity corresponding to the each frame of the images to be captured, and a preset mode of exposure compensation, wherein the preset mode of exposure compensation is a combination of exposure values (EVs) preset for the each frame of the images to be captured, and the combination EVs corresponding to the present mode of exposure compensation comprises EVs for processing images to be captured with overexposure, EVs for processing images to be captured with normal exposure and EVs for processing images to be captured with underexposure;

capturing a plurality of frames of images in sequence according to the reference photosensitivity and the exposure duration corresponding to the each frame of the images to be captured; and performing synthesis processing on the captured plurality of frames of images to generate a target image.

13. The electronic device of claim 12, wherein when the instructions are executed by the processor, the processor further performs actions of:

determining whether the exposure duration corresponding to the each frame of the images to be captured is within a preset range of exposure duration; and when an exposure duration of at least one frame of the images to be captured is not within the preset range of exposure duration, updating the exposure duration of the at least one frame of the images to be captured according to the preset range of exposure duration to guarantee that the updated exposure duration of the at least one frame of the images to be captured is within the preset range of exposure duration.

14. The electronic device of claim 13, wherein when the instructions are executed by the processor, the processor further performs the actions of:

according to a difference value between an exposure duration of the at least one frame of the images to be captured before the update and that after the update, determining whether a preset condition for adjustment is satisfied, and when the preset condition for adjustment is satisfied, adjusting a photosensitivity of the each frame of the images to be captured and adjusting exposure durations of other frames of the images to be captured except the at least one frame of the images to be captured whose exposure duration has been updated.

15. The electronic device of claim 12, wherein determining the exposure duration corresponding to the each frame of the images to be captured according to the luminance of the current shooting scene, the reference photosensitivity corresponding to the each frame of the images to be captured, and the preset mode of exposure compensation comprises:
   determining a reference amount of exposure according to the luminance of the current shooting scene;
   determining a reference exposure duration according to the reference amount of exposure and the reference photosensitivity corresponding to the each frame of the images to be captured; and
   determining the exposure duration corresponding to the each frame of the images to be captured according to the reference exposure duration and the preset mode of exposure compensation.

16. The electronic device of claim 15, wherein when the instructions are executed by the processor, the processor further performs an action of:
   determining the preset mode of exposure compensation according to the current jitter degree of the camera module.

17. The electronic device of claim 16, wherein determining the preset mode of exposure compensation comprises:
   determining that the preset mode of exposure compensation is a first mode according to the current jitter degree of the camera module when the camera module currently starts an automatic exposure function; or
   determining that the preset mode of exposure compensation is a second mode according to the current jitter degree of the camera module when the camera module currently does not start the automatic exposure function;
   wherein a range of exposure compensation corresponding to the second mode is greater than a range of exposure compensation corresponding to the first mode.

18. The electronic device of claim 16, wherein,
   when the instructions are executed by the processor, the processor further performs an action of:
   determining attribute information of one or more components of the camera module; and
   determining the preset mode of exposure compensation comprises determining the preset mode of exposure compensation according to the attribute information of the one or more components and the current jitter degree of the camera module.

19. The electronic device of claim 12, wherein performing synthesis processing on the captured plurality of frames of images comprises:
   performing synthesis processing on the captured plurality of frames of image according to a preset weight value corresponding to each frame in the plurality of frames of images.

20. A non-transitory computer readable storage medium having stored thereon a computer program that is executable by a processor to perform actions of:
   when detecting that an image currently captured by a camera module contains a human face, determining a reference photosensitivity corresponding to each frame of images to be captured according to a current jitter degree of the camera module;
   determining an exposure duration corresponding to the each frame of the images to be captured according to luminance of a current shooting scene, the reference photosensitivity corresponding to the each frame of the images to be captured, and a preset mode of exposure compensation, wherein the preset mode of exposure compensation is a combination of exposure values (EVs) preset for the each frame of the images to be captured, and the combination of EVs corresponding to the present mode of exposure compensation comprises EVs for processing images to be captured with overexposure, EVs for processing images to be captured with normal exposure and EVs for processing images to be captured with underexposure;
   capturing a plurality of frames of images in sequence according to the reference photosensitivity and the exposure duration corresponding to the each frame of the images to be captured; and
   performing synthesis processing on the captured plurality of frames of images to generate a target image.

* * * * *